Patented Dec. 28, 1948

2,457,306

UNITED STATES PATENT OFFICE 2,457,306

SYNTHETIC POLYMERS OF HEXADIENE-1,5

Henry Dreyfus, London, England; Claude Bonard, administrator of said Henry Dreyfus, deceased, assignor to Celanese Corporation of America, a corporation of Delaware No Drawing. Application January 22, 1944, Serial No. 519,361. In Great Britain December 3, 1942

Section 1, Public Law 690, August 8, 1946
Patent expires December 2, 1962

5 Claims. (Cl. 260—93)

1

This invention relates to organic compounds, and especially to hexadiene polymers.

I have found that a useful series of synthetic resins of relatively high melting point when compared with straight chain hydrocarbons of high molecular weight can be obtained by polymerising hexadiene 1:5 under the influence of heat. The bromine absorption of the polymers of the invention compared with that of the monomers together with the relatively high melting points, which are above the theoretical maximum melting point for a straight-chain paraffin hydrocarbon, provide evidence that the polymers of the invention are unsaturated polycyclic compounds.

The polymerisation may be carried out under reflux, for so long as the reaction mixture contains volatile constituents sufficient to form a blanket of vapour substantially excluding air. As the polymerisation progresses, the volatility of the reaction mixture decreases and polymerisation may then be completed in vacuo, or in an atmosphere of inert gas, for example nitrogen, or vapour.

When hexadiene 1:5 is heated for about 6 hours under reflux, by means of a heating fluid maintained at about 180° C., a polymer melting at about 90–95° C., the bromine absorption of which is about 44% that of hexadiene itself, is obtained. The intrinsic viscosity of this polymer is about 0.16. For convenience this polymer will be referred to below as "the low melting polymer."

When the low melting polymer is heated for a further 3 hours at about 180° C., in an atmosphere of nitrogen a polymer of melting point 121° C., intrinsic viscosity 0.24 and bromine absorption about 27% that of hexadiene, is obtained. This polymer is soluble in hot alcohol, in acetone and in m-cresol, but insoluble in water. The molten polymer can be drawn into fibres.

If the polymerisation of the low melting polymer be continued for 6 hours instead of 3, at the same temperature, a polymer melting at 156–158° C., of intrinsic viscosity 0.26 and bromine absorption value 22.4% that of hexadiene, is obtained. This polymer has similar solubility properties to that described immediately above, and also can be drawn into fibres in the molten condition.

If the polymerisation of the low melting polymer be continued for as long as 16 hours at about 180° C., an infusible polymer of intrinsic viscosity 0.19 and bromine absorption value about 22% that of hexadiene, is obtained. This polymer is brittle, insoluble in water, acetone and alcohol, but slowly dissolves in hot m-cresol. Similarly, by conducting the further polymerisation of the low melting polymer at temperatures above about 200° C., infusible polymers of very low bromine absorption values can be obtained. For instance, by heating the low melting polymer for 3 hours at 220° C., an infusible polymer which, however, softens to give a rubbery-mass at about 190° C., is obtained. This polymer has an intrinsic viscosity of 0.17, its bromine absorption value is only about 18% that of hexadiene, it is insoluble in water and alcohol, but dissolves slowly in hot acetone and m-cresol.

The further polymerisation of the low melting polymer may be carried out in vacuo, or under greatly reduced pressure, instead of in an atmosphere of inert gas. Thus, for instance, by heating the low melting polymer for about 3 hours under a pressure of 4-5 mm. of mercury, by means of a heating fluid maintained at about 180° C. a polymer of melting point 115-120° C., intrinsic viscosity 0.17 and bromine absorption value about 40% that of hexadiene, is obtained. This polymer is soluble in acetone, hot alcohol and m-cresol. Fibres can be drawn from the molten polymer, but these, unlike those referred to above, are sticky.

Polymerisation can be effected in solution in an inert high boiling substance which is liquid at the desired temperature of polymerisation. Thus, for example, the low melting polymer referred to can be polymerised further by boiling for several hours under reflux a 25% solution of the polymer in phenol. After about 4 hours' heating under these conditions, a polymer is obtained of melting point about 133–235° C., intrinsic viscosity 0.24 and bromine absorption value about 33% that of hexadiene. Similarly a solution of the low melting polymer in higher boiling solvents, e. g. m-cresol, can be heated at about 170-190° C., an inert gas or vapour being supplied to exclude air. At lower temperatures low melting polymers have been obtained. Thus when a 25% solution of hexadiene 1:5 in xylene is boiled under reflux for 24 hours, about 50% of the liquid polymer referred to below is obtained, together with a solid polymer of melting point 70-73° C., intrinsic viscosity 0.12 and bromine absorption about 37% that of the monomer. A solution of the same concentration in mesitylene boiled under reflux for the same period, gives about 20% of liquid polymer together with a solid polymer melting at 89-95° C. and having an intrinsic viscosity of 0.19 and bromine absorption about 29% that of the monomer. On the other hand, by boiling under reflux solutions of the same concentration in solvents of very high boiling point, polymers of high melting point and low bromine absorption can be obtained. Thus for instance, using tertiary butyl xylene as the solvent, a polymer melting at 125-127° C. of intrinsic viscosity 0.26 and bromine absorption about 18% that of the monomer, is obtained accompanied by about 20% of liquid polymer, and when the solvent is naphthalene, a polymer of about the same melting point, intrinsic viscosity and bromine absorption is obtained, accompanied by a lower proportion of liquid polymer. It is preferable to employ a solvent for the monomer or intermediate polymer, which is also a solvent for the desired polymer but this is not essential. Polymerisation may also be carried out by the emulsion method, i. e. the monomer or intermediate polymer may be emulsified, preferably together with a catalyst, of which examples are given below, in a high boiling inert nonsolvent.

It is not essential to start with the low melting polymer specified above. Thus, the liquid polymer of boiling point 97–98° C. under 20 mm. pressure, obtainable by heating hexadiene 1:5 under reflux for about 16 hours by means of a heating fluid maintained at about 150–170° C., may be employed. This liquid polymer is thought to be a dimer of hexadiene. By heating it for about 3 hours at 180° C. in an atmosphere of nitrogen, a polymer of melting point about 140° C., intrinsic viscosity 0.21 and bromine absorption value about 37% that of hexadiene, is obtained. This polymer is insoluble in water and soluble in acetone, hot alcohol and m-cresol. Good fibres, having substantial elasticity and an extension at the breaking point of about 30%, can be drawn from the molten polymer. Fibres can also be obtained from acetone solutions of the polymer, by wet or dry spinning methods. On reduction by hydrogen this polymer gives a somewhat rubbery synthetic resin from which, however, fibres can be drawn and which has a melting point of 235° C.

The invention includes the thermal polymerisation of other hexadienes, e. g., hexadiene 2:4 and hexadiene 1:3, in the manner described above for hexadiene 1:5. It appears probable that isomerization of the 1:5 to 2:4 hexadiene occurs as a step in the production of the polymers described above.

The invention has been described with particular reference to polymerisation in the absence of a catalyst. The polymerisation may however be catalysed, for instance by alkali metals; by boron trifluoride, stannic chloride or other Friedel & Craft catalysts; or by oxygen or oxygen-producing compounds, for instance benzoyl peroxide, peracetic acid and other organic peroxides or peracids. The use of catalysts enables the reaction to be carried out at much lower temperatures, for instance, at atmospheric temperature. The polymerisation may also be accelerated by irradiation, for example, with light or ultra-violet radiation. A further method of accelerating the polymerisation is by working at high pressure, e. g. 10–100 atmospheres or more. Polymerisation may be carried out in the presence of other unsaturated organic compounds adapted to undergo polymerisation at the same time, e. g. monovinyl compounds such as vinyl chloride, vinyl acetate, acrylo nitrile, acrylic acid and its esters, styrene and its derivatives, or diene hydrocarbons and their derivatives, e. g. butadiene 1:3, isoprene, chloroprene and 1-cyano butadiene 1:3, and similar compounds having a pair of conjugated double bonds.

The fusible high melting polymers of the invention may be employed in the production of artificial silk by spinning solutions of the polymer in volatile solvents, for example acetone, into an evaporative atmosphere; or by spinning solutions of the polymer into a bath which is a non-solvent for the polymer but a solvent for the liquid in which the polymer is dissolved; or by spinning the polymer in the molten condition and rapidly cooling the filament as it emerges from the extrusion orifice. Sheets may be formed from the polymers of the invention, for instance by wet or dry film casting methods or by slicing from a block of the material.

The polymers may be employed in the production of moulded articles by extrusion, hot-compression moulding or by injection moulding.

Suitable plasticisers for incorporation with the polymers, for instance in stock from which sheets, mouldings and the like are to be formed, include triphenyl-phosphate, tricresyl phosphate, tributyl phosphate, butyl oleate, butyl stearate, amyl stearate, cyclohexyl stearate, amyl benzoate, dibutyl phthalate, di-iso-butyl phthalate, di-amyl phthalate, methylcyclohexyl adipate, camphor, ethylacetanilide and other plasticisers for cellulose nitrate which are soluble in liquid hydrocarbons. The plasticised stock may be formed by dissolving the polymer together with the plasticiser in a volatile solvent and evaporating the solvent or at least the bulk thereof, for example by working the stock on hot malaxating rolls. The plasticised stock may be formed into moulding powders, for instance by grinding, or precipitation from solution, and these powders may also contain fillers, pigments or other constituents designed to modify the physical properties of the composition,. Anti-oxidants such as are used to inhibit or retard the oxidation of rubber may also be incorporated with the polymers.

The polymers serve also as lacquer bases, and as the basis for coating compositions for fabrics, wood and other fibrous materials, and for uniting layers of such materials under heat and pressure to form laminated products. They may also be employed for the insulation of electric conductors. One method of employing the polymers in the insulation of electric conducting wires is to extrude a coating of the polymer on to the wire while this is passing through a heated die. Another method is to impregnate fabric tapes with the polymer, to lap the conductors with the impregnated tape, and unite successive layers of tape by the application of heat and pressure. A further method is to braid or otherwise cover the conductor with threads of the polymer, and afterwards to form the covering into a continuous coating by the application of heat and pressure. A further use of the polymers is in the insulation of electrostatic condenser plates.

The polymers of the invention may be hardened, and rendered infusible and insoluble by further polymerisation or by reaction with a bifunctional or polyfunctional reagent capable of forming strong cross-links between the unsaturated carbon atoms of the polymers. Examples of such agents are sulphur, sulphur dioxide and sulphur chloride. Such hardening agents may be incorporated in moulding stock and the hardening may be carried out after or during a moulding or like operation. The polymers may also be chlorinated, for instance by the direct action of chlorine. A further method of reducing or destroying their unsaturation is by hydrogenation and one example of the application of this method has been described above.

Having described my invention, what I desire to secure by Letters Patent is:

1. Process for the manufacture of polycyclic unsaturated synthetic resins which are solid at temperatures below 120° C., which comprises heating hexadiene-1:5 in the absence of other unsaturated hydrocarbons to a temperature of 150° C.–180° C. until a polymer of melting point lower than 100° C. has been formed, and then heating this low melting polymer to a temperature of 180° C.–220° C. for at least three hours by means of a phenol as heating liquid, the whole of the process being carried out under non-oxidizing conditions.

2. Process for the manufacture of infusible polycyclic unsaturated resins, which comprises heating hexadiene-1:5 in the absence of other unsaturated hydrocarbons to 180° C. for six hours, whereby a low melting polymer of melting point between 90° and 95° C. is produced, and then heating the said low melting polymer to a temperature of 180°–220° C. for a period ranging from sixteen hours at 180° C. to three hours at 220° C. by means of a phenol as heating liquid, the whole of the process being carried out under non-oxidizing conditions.

3. Process for the manufacture of polycyclic unsaturated synthetic resins of melting point above 120° C., which comprises heating hexadiene-1:5 in the absence of other unsaturated hydrocarbons to 180° C. for six hours whereby a low melting polymer of melting point between 90° and 95° C. is produced, and then heating the said low melting polymer to 180° C. for a further three to six hours by means of a phenol as heating liquid, the whole of the process being carried out under non-oxidizing conditions.

4. Process for the manufacture of infusible polycyclic unsaturated synthetic resins, which comprises heating hexadiene-1:5 in the absence of other unsaturated hydrocarbons to 180° C. for six hours whereby a low melting polymer of melting point between 90° and 95° C. is produced, and then heating the said low melting polymer in boiling phenol under atmospheric pressure for sixteen hours.

5. Process for the manufacture of polycyclic unsaturated synthetic resins of melting point above 120° C. which comprises heating hexadiene-1:5 in the absence of other unsaturated hydrocarbons to 180° C. for six hours whereby a low melting polymer of melting point between 90° and 95° C. is produced, and then heating the said low melting polymer in boiling phenol under atmospheric pressure for three to six hours.

HENRY DREYFUS.

REFERENCES CITED

The following references are of record in the file of this patent:

UNITED STATES PATENTS

| Number | Name | Date |
| --- | --- | --- |
| 1,074,432 | Hofmann | Sept. 30, 1913 |
| 2,023,495 | Thomas | Dec. 10, 1935 |
| 2,093,096 | Pier | Sept. 14, 1937 |
| 2,122,826 | Van Peski | July 5, 1938 |
| 2,384,975 | Sparks | Sept. 18, 1945 |

OTHER REFERENCES

Whitby, Canadian J. Research, vol. 6, (1932) pp. 280–290.

Whitby, Canadian J. Research, vol. 6 (1932) pp. 203–225.

Lebedev et al.: J. Russ. Phys. Chem. Soc. 45, 1249–1388; abstracted in Chem. Abs., 8, 320–323 (1914).